May 21, 1940.  J. G. TINGLE  2,201,639

TWO WHEELED MOTOR VEHICLE

Filed Feb. 7, 1939  2 Sheets-Sheet 1

Inventor
JAMES G. TINGLE,
Shepherd Campbell
Attorneys

May 21, 1940.  J. G. TINGLE  2,201,639
TWO WHEELED MOTOR VEHICLE
Filed Feb. 7, 1939   2 Sheets-Sheet 2
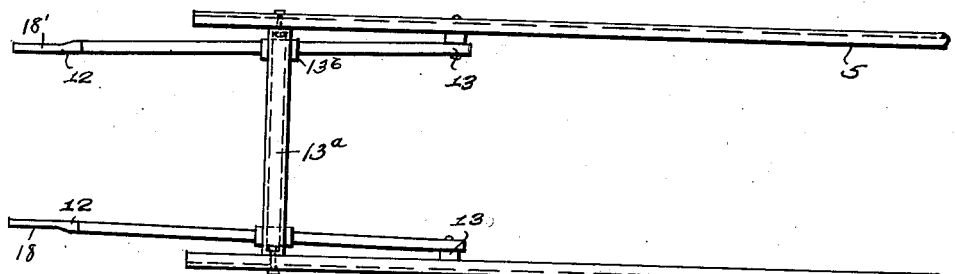
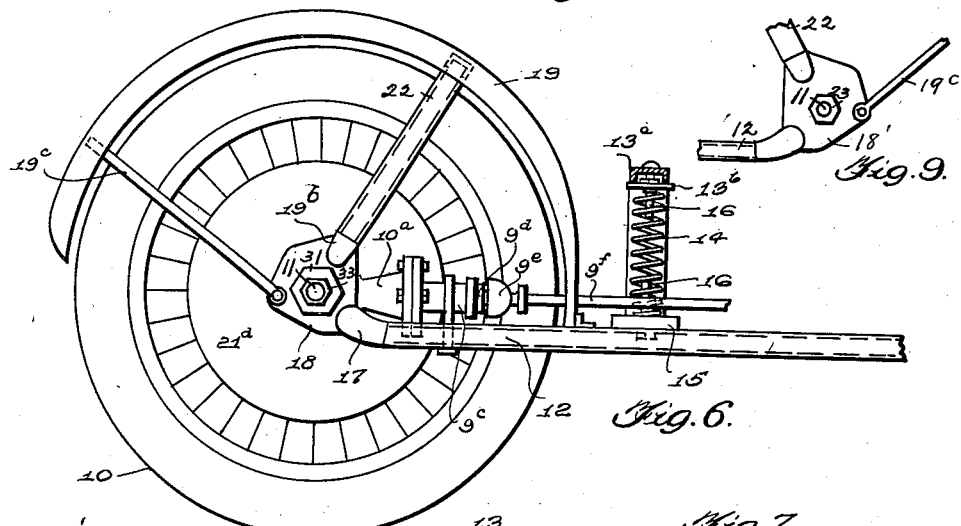
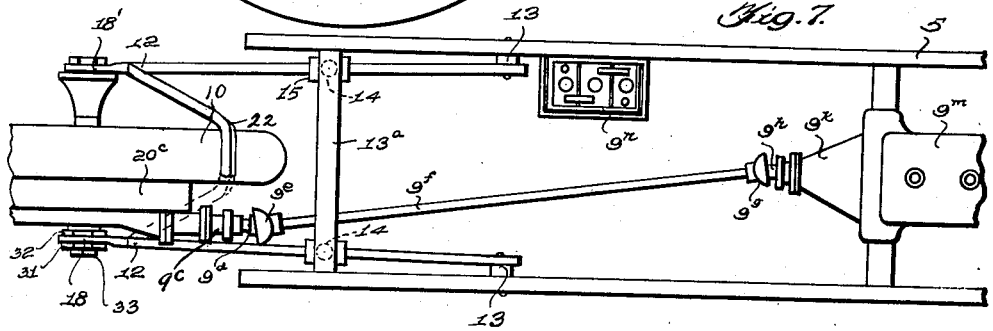
Inventor
JAMES G. TINGLE,
By Shepherd Campbell
Attorneys Patented May 21, 1940

2,201,639

UNITED STATES PATENT OFFICE 2,201,639

TWO WHEELED MOTOR VEHICLE

James G. Tingle, Miami, Fla.

Application February 7, 1939, Serial No. 255,145

2 Claims. (Cl. 180—33)

This invention relates to motor vehicles of the tandem, two-wheeled type comprising a long narrow body, a rear propelling ground wheel, and a steerable front wheel. The machine of the present invention is very similar to that shown in my Patent No. 2,141,568, issued on December 27, 1938, and the application for which was filed February 14, 1938.

As this description proceeds, it will be seen that the present application adds new features of construction by virtue of which the drive mechanism is improved, a better balance of parts is achieved, and increased rigidity of the frame is brought about.

In the accompanying drawings:

Fig. 5 is a partial plan view of the machine frame;

Fig. 6 is an enlarged side elevation of the rear wheel mounting, parts being broken away for clearness;

Fig. 7 is a view similar to Figure 5, illustrating the rear wheel driving connection;

Fig. 8 is an enlarged fragmentary section illustrating the control means for the caster wheels, and Fig. 9 is a fragmentary side elevation of the fork connection from the left side of the machine.

Like numerals designate corresponding parts throughout the several figures of the drawings.

Figure 1:
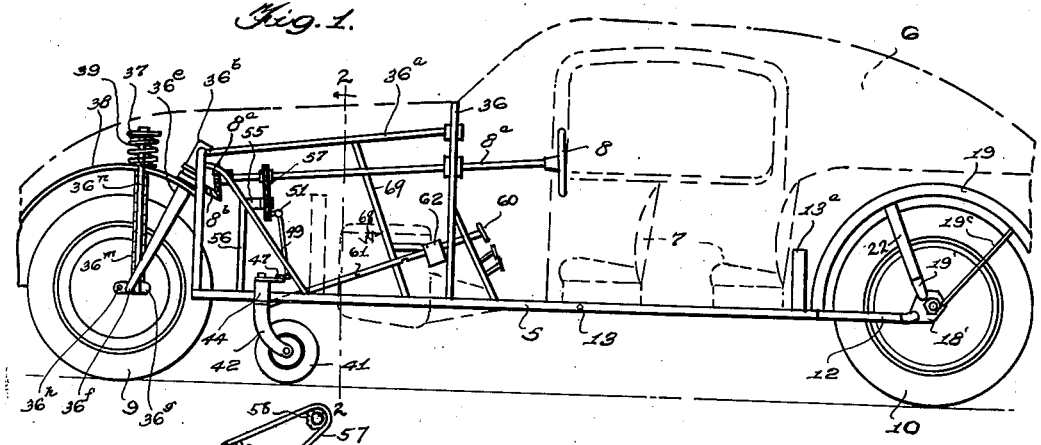
Figure 1 is a view partly in side elevation and partly in section of a machine construction in accordance with the invention.
Figure 2:
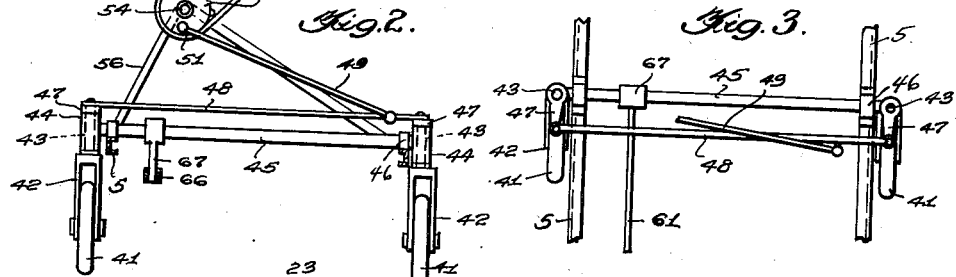
Fig. 2 is a transverse sectional view upon line 2—2 of Fig. 1, illustrating the steerable prop wheels hereinafter described.
Figure 3:
Fig. 3 is a plan view of the prop wheels with certain of the parts omitted.

The main horizontal frame members of the machine are indicated at 5, and this frame supports any suitable type of body and seats, indicated in a general way in dot and dash lines at 6 and 7. A hand steering wheel 8, accessible from the driver's seat 7, is utilized to impart turning movement to the steering front ground wheel 9 through gears 8a, 8b. This ground wheel 9, together with the rear driving wheel 10, constitute the rolling supports for the vehicle.

The propelling ground wheel 10 is supported by means of a solid shaft 11 at the rear ends of the rear fork members 12, said rear fork members being pivotally mounted at 13 upon the side frame members 5. A supporting member 13a, of inverted U-shape, has the lower ends of its legs attached to the side frame members 5, and its top transverse portion carries plates 13b. Springs 14 bear between the plates 13b and any suitable form of blocks 15, mounted upon the members 12 of the rear forks. Guide bolts 16 project downwardly from 13a and upwardly from 15 to prevent the accidental dislodgment of the springs 14.

Through the cross member 13a, the rear end of the main frame is spring supported upon the rear fork 12, and the rear fork is in turn supported upon the rear ground wheel. The rear forks are preferably made of channel steel, which gives great strength with lightness, and the rear ends of these members are welded to strengthening protuberant portions 17, and these members are in turn welded to enlarged plates 18, 18'. A transverse yoke 22, likewise of channel formation and of U-shape, extends over the body of the rear wheel, forms a support for a mud guard 19, and has its protuberant lower ends 19b welded to the plates 18, 18'. Mud guard braces 19c are also connected to these plates.

Figure 4:
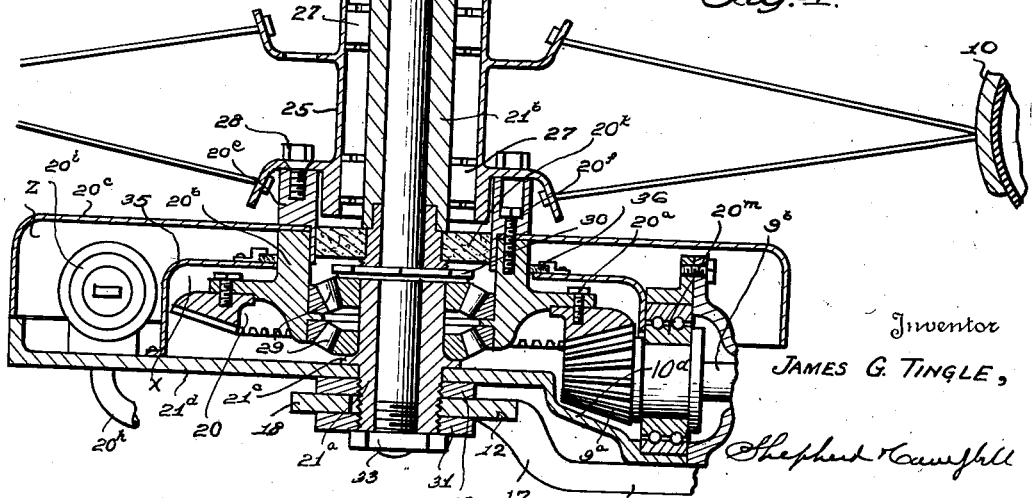
Fig. 4 is a horizontal sectional view of the drive gear connections for the rear wheels.

Referring now to Fig. 4, it will be seen that the plate 18 has a hollow shaft section 21a passing therethrough and that the plate 18 is bound between nuts 31 and 32, threaded upon said hollow shaft section. The shaft 11 passes through the hollow shaft section 21a and has a nut 33 threaded thereon. A collar 21c, on the hollow shaft section 21a, acts as a member against which a fixed cover disk 21d may be bound by the inner nut 32.

The hollow shaft section 21a has a reduced end portion which fits into a hollow shaft section 21b, both of these hollow shaft sections being supported upon the solid shaft 11. A ring gear tooth section 20 is secured by bolts 20a to the ring gear body 20b. This ring gear body is supported by roller bearings 29 upon the periphery of the hollow shaft section 21a, and an adjusting nut 30 provides means for adjusting these roller bearings.

A rotative brake drum 20c is bound between the ring gear body 20b and a ring 20e by means of bolts 20f, so that the brake drum is caused to rotate with the ring gear, and so that braking of the vehicle may be effected through the medium of this brake drum and ring gear.

The rear wheel hub 25 is mounted upon the periphery of the hollow shaft section 21b through the medium of roller bearings 27, and this rear wheel hub, and consequently the ring gear, partake of the rotation of the rear wheel by being secured to the ring body 20e through the medium of cap screws 28. A filler piece 24 surrounds the shaft 11 and lies between the end of 21b and the plate 18'. A nut 23 binds the plate 18' against the filler piece 24. A division wall 35 separates the space within the brake drum into a ring gear compartment X and a brake cylinder compartment Z.

The compartment X may contain lubricant for the gears, and to prevent this lubricant from getting over into the brake cylinder compartment, a felt washer 36 is secured to the division wall 35 and bears upon the periphery of the ring gear body 20b. Pressure fluid for operating hydraulic brakes may be introduced through the tube indicated at 20h, one of the brake cylinders being indicated at 20i. Brake shoes are not shown since these are of well-known conventional type.

A felt washer 20k prevents the escape of grease outwardly through the ring gear body 20e. The ring gear tooth section 20 meshes with a bevel pinion 9a, and the brake drum cover plate 21d is so shaped as to constitute a part of the housing 10a for said pinion and for the anti-friction bearing 20m of said pinion.

The shaft 9b leading from the pinion is extended through a housing member 9c and is connected to one of the elements 9d of a conventional, well-known, Spicer universal joint. The other member 9e of this universal joint has connection with one end of a drive shaft 9f. One end of this shaft has connection with one end of a universal joint 9g. The other member of this last-named universal joint, indicated at 9h, is driven in the usual way through the transmission mechanism (the casing of which is indicated at 9k) of a centrally disposed engine 9m.

A battery and battery box are indicated at 9n, this battery supplying the current for the ignition system of the engine, for lights, etc., and it will be observed that the oblique disposition of shaft 9f permits the central location of the engine and at the same time permits the battery to be placed so that it will counter-balance the weight of the driving gear mechanism shown in Fig. 4.

The frame of the machine comprises a dash 36. A tie rod 36a leads from this dash to the head 36b, in which the front forks 36e of the vehicle are mounted to turn. The lower ends of these forks are pivotally connected at 36f to links 36g, said links in turn being pivotally mounted upon the axle 36h of the front or steering wheel.

A sleeve 36m is fixed to the front fork 36e, and at its upper end this sleeve supports a mud guard 38. This sleeve 36m is duplicated upon the opposite side of the machine. Rods 36n pass through the sleeves and through plates 37. Springs 39 bear between plates 37 and the mud guard. Caster prop wheels 41 are carried in forks 42.

These forks 42 are provided with shanks 43, and the shanks are journaled to turn in the T-heads 44 of a transverse rock shaft 45. This rock shaft is in turn journaled to turn in bearings 46 of the frame 5, the upper ends of the shanks 43 being provided with crank arms 47. These crank arms are connected at their outer ends by a link 48.

One end of a drag link 49 is connected by a ball and socket joint to link 48. The other end of the link 49 is connected at 51 by a ball and socket joint with the rear side face of a sprocket wheel 53. This sprocket wheel is mounted upon a stub shaft 54, said stub shaft lying at an inclination and in parallelism with the hand steering shaft 8a by which the hand wheel 8 is carried.

The stub shaft 54 is mounted in a bearing 55 of a supporting frame 56. It is to be especially noted that frame 56 is of such shape that the shaft 54 is caused to lie much closer to one side of the machine than to the other. Thus the sprocket wheel 53 is brought so far to one side of the machine that the drag link 49 can extend a material distance across the machine and thereby more effectively function.

The connections between 8a and sprocket 53 comprise sprocket chain 57 and sprocket 58 on shaft 8a. Thus the hand wheel 8 not only functions to steer the machine as a whole but it also functions through the connections described to steer the ground wheels in unison with the front wheel. This is of great importance, especially in backing.

The arrangement shown is an advantageous one because it maintains a steering connection to the ground wheels at all times but permits the ground wheels to be thrown from elevated to lowered position and vice versa. The ball and socket connections at the ends of drag link 49 permit this drag link to swing upwardly and over the top of rock shaft 45 when the prop wheels are elevated by the rocking of the rock shaft.

A pedal 60 is rigidly mounted upon the rear end of a thrust link 61. This link slides through a housing 62, said housing carrying a lug 63 which is adapted to engage in either of the notches 64, 65 to thereby hold link 61 in either of the positions to which it may be moved.

The forward end of link 61 is pivotally connected at 66 to a crank arm 67 of rock shaft 45, and when the pedal 60 is thrust forwardly, the prop wheels are rocked downwardly into position to engage the ground and to prevent undue tipping of the machine as a whole when the machine comes to a rest either in traffic or at other times.

When the notch 65 is released from detent 63, a spring 68, connected to crank 66 and to a brace 69, acts to draw the prop wheels quickly upwardly. This also moves the link forward until notch 64 engages detent 63 to thereby positively hold the prop wheels in elevated position.

It is to be understood that the invention is not limited to the precise construction set forth, but that it includes within its purview whatever changes fairly come within either the terms or the spirit of the appended claims.

Having described my invention, what I claim is:

1. The combination with an elongated main frame for a two-wheeled, tandem type vehicle, of a pair of rear fork members pivotally connected thereto, a pair of enlarged plates, to which the rear ends of the rear fork members are rigidly connected, a yoke of inverted U-shape, having the lower ends of its legs rigidly connected to said plates and extending over the top of said rear wheel, a two-part tubular shaft, a solid shaft traversing said tubular shaft, means for binding the plate of one of the fork members upon one of the sections of the tubular shaft, means for binding the other of said enlarged plates upon the solid shaft, a ring gear mounted to turn upon one of the sections of the tubular shaft, a rear driving wheel mounted to turn upon the other section of the tubular shaft, a pinion meshing with the ring gear, a short shaft section by which the pinion is carried, bearings for holding said short shaft section in proper alignment and in operative relation to the ring gear, an obliquely disposed driving shaft, and universal joint connections between the ends of said driving shaft and the engine upon the one hand, and between said short shaft section and the engine upon the other hand.

2. The combination with a main frame, comprising a pair of side frame members, of rear fork members pivotally connected to the main frame, a pair of enlarged plates lying in vertical planes to which the rear ends of the rear fork members are rigidly connected, a two-part tubular shaft, a solid shaft extending through said tubular shaft, means for binding the plates to one of the forked members upon one of the sections of the tubular shaft, a filler piece lying between the other of said plates and the other member of the two-part shaft and through which the solid shaft passes, means threaded upon the solid shaft for binding the last named plate against said filler piece, a rear driving wheel comprising a hub mounted upon one of the parts of the tubular shaft and a rigid yoke of inverted U-shape extending over the top of said driving wheel and having the lower ends of its legs rigidly affixed to said plates, said yoke being formed of a material of such strength and rigidity as to constitute a strong and rigid connection between said plates.

JAMES G. TINGLE.